No. 775,931. PATENTED NOV. 29, 1904.
C. W. OTT.
CLOTHES LINE HOLDER AND TIGHTENER.
APPLICATION FILED OCT. 27, 1903.
NO MODEL. 2 SHEETS—SHEET 1.
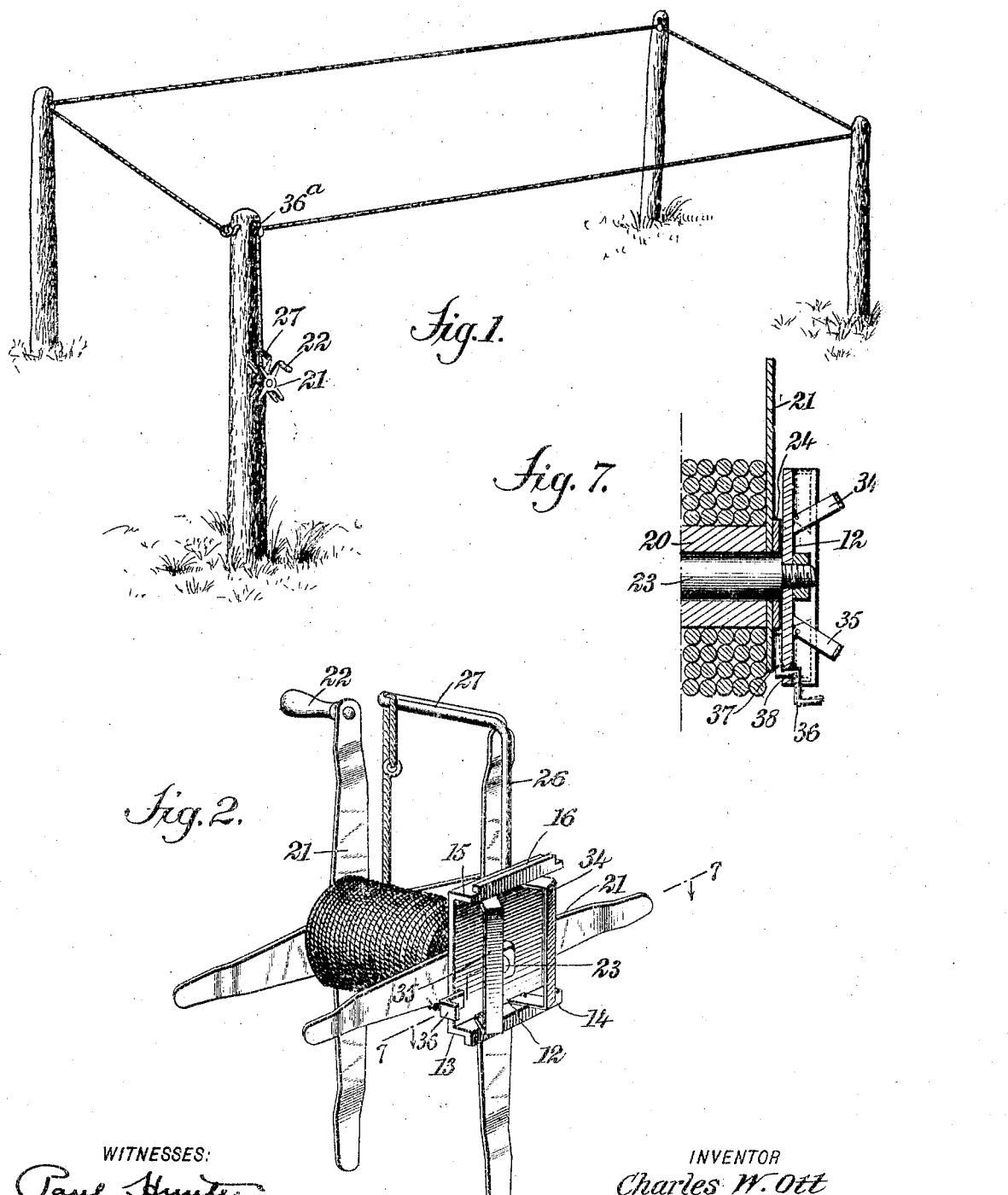
WITNESSES:
Paul Hunter
R. B. Cavanagh
INVENTOR
Charles W. Ott
BY
ATTORNEYS No. 775,931. PATENTED NOV. 29, 1904.
C. W. OTT.
CLOTHES LINE HOLDER AND TIGHTENER.
APPLICATION FILED OCT. 27, 1903.
NO MODEL. 2 SHEETS—SHEET 2.
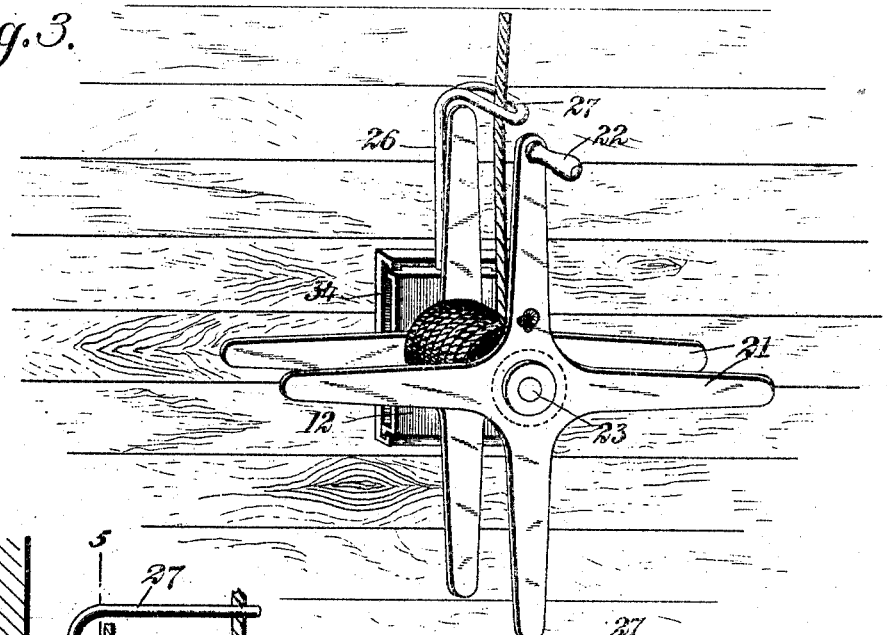
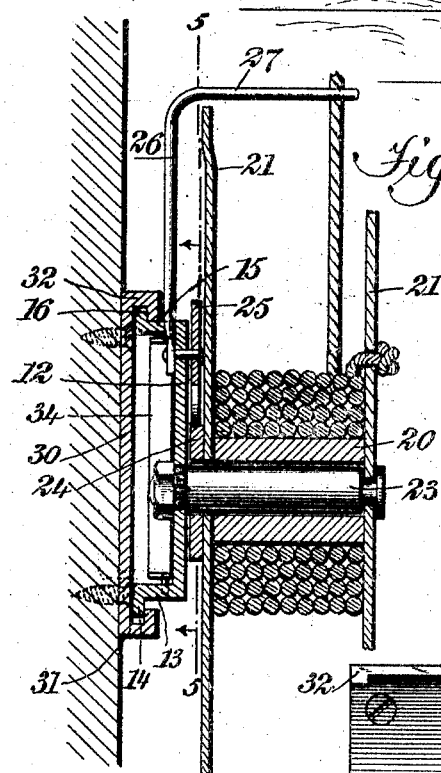
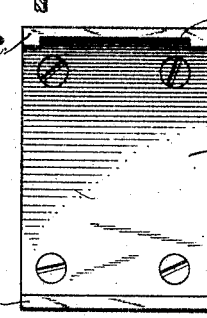
WITNESSES:
INVENTOR
Charles W. Ott
BY
ATTORNEYS No. 775,931.

Patented November 29, 1904.

UNITED STATES PATENT OFFICE.

CHARLES W. OTT, OF PITTSBURG, KANSAS.

CLOTHES-LINE HOLDER AND TIGHTENER.

SPECIFICATION forming part of Letters Patent No. 775,931, dated November 29, 1904.

Application filed October 27, 1903. Serial No. 178,681. (No model.)

*To all whom it may concern:*

Be it known that I, CHARLES W. OTT, a citizen of the United States, and a resident of Pittsburg, in the county of Crawford and State of Kansas, have invented a new and Improved Clothes-Line Holder and Tightener, of which the following is a full, clear, and exact description.

The purpose of this invention is to provide an improved form of clothes-line holder and tightener that will serve as a convenient reel that may be carried about in the hand and also that may be removably attached to a bracket secured to a post or the side of a building and which, further, has a means for retaining the line taut when set up on the poles and drawn tight.

With these objects in view my invention comprises the novel features as hereinafter set forth and then particularly pointed out in the claims.

Reference is to be had to the accompanying drawings, forming a part of this specification, in which similar characters of reference indicate corresponding parts in all the figures.

Figure 1 represents a set of poles with a line on the reel of my invention and suspended from the several poles, the reel being attached to one of the poles. Fig. 2 is a perspective view of the reel and attaching-plate removed from the bracket. Fig. 3 is a perspective view of the reel and attaching-plate as in place in the supporting-bracket, the latter being secured to a building. Fig. 4 is a vertical axial section through the device. Fig. 5 is a vertical section on the line 5 5 of Fig. 4. Fig. 6 is a side elevation of the attaching-plate, and Fig. 7 is a sectional view taken on the line 7 7 of Fig. 2.

Referring now to the drawings, 12 designates the reel-carrying member that has a right-angled bend 13, one end of which has another bend, 14, while the other end of the member 12 has similar bends 15 and 16, the bends 14 and 16 extending in the same plane in opposite directions. It will be seen from Fig. 5 that the bend or flange 16 does not extend the full width of the plate 12.

The reel comprises a hub 20, to which is secured at each end a star-plate 21. On one end of one of the arms of one of the plates 21 is secured a suitable handle 22, by which the reel can be rotated. A spindle 23 is secured to the plate 12, on which spindle the reel is rotatably mounted.

A ratchet-wheel 24 is secured to the inner face of the reel, and a pawl 25 is pivoted to the plate 12 above the ratchet-wheel, with its free end normally in engagement with the periphery of said ratchet-wheel, which it will engage by gravity when the plate 12 is in the position indicated in Figs. 3, 4, and 5.

A suitable guide-arm 26 is secured to the upper portion of the plate 12 and projects upwardly above the arms of the reel and is then bent outwardly over the reel and formed into a loop 27, which extends parallel to the axis of revolution of the reel.

In order to support the reel on a post, building, or any desired place, I provide a bracket member comprising a plate 30, having bends 32 31 at its upper and lower extremities, respectively, thus forming horizontal channels of a size to snugly fit the projections 14 16 of the attaching-plate 12. In the bend 32 of the plate 30 I cut away an intermediate portion at 33 of a length equal to the length of the extension 16 of the plate 12.

It will be observed in Fig. 4 that the extreme length of the plate 12, including the extensions 14 and 16, is slightly less than the distance between the bottom of the channels formed by the bends 31 32 of the bracket or plate 30. My object in thus proportioning the parts is that when the reel is to be attached to the bracket the extension 14 of the plate 12 is first pushed in over the bent portion 31, with the plate somewhat inclined outwardly at the top, whereupon the extension 16 is inserted into the cut-away portion 33 of the extension 32.

When the rope is drawn upwardly through the eye or loop 27 of the guide-arm to a suitable guide-pulley or the like secured to a post or building above the bracket and the rope drawn tight by winding up the reel, it will be observed that this operation will serve to raise the reel and its attaching-plate, thus bringing the extension 16, with its upper edge, fully into the channel formed by the bent portion 32 of the bracket.

In order to facilitate the handling of the reel when removed from the bracket, I provide a pair of handles, preferably consisting of bent bars 34 35, that are pivotally secured to the opposing inner faces of the bent ends of the attaching-plate 12, as is shown in Fig. 2.

I have also found it desirable to provide my improved device with a brake for preventing the turning or revolutions of the reel at times, and in the present invention I have shown such brake as formed of a single strip of material, comprising a finger portion 36 and a bearing or contacting portion 37. This strip is inserted through an opening 38, formed in the plate 12, a fulcrum for the brake being provided by the material at the edge of such opening. In order to apply the brake, it is only necessary to press upon the finger portion 36, which will throw the bearing part 37 into contact with the side of the reel adjacent to the ratchet-wheel.

The operation of my improved device is as follows: The reel and plate are detached from the supporting-bracket and grasped by the hand, the reel being turned through an arc of ninety degrees or more, so that the pawl 25 will fall away from the ratchet-wheel 24 by gravity. The outer end of the line is then attached to a pole or building, and as the person moves away from the pole the line will unwind and play out as fast as needed, the ratchet-wheel now being free. The line is finally brought to the pole or building and passed over a guide-pulley 36$^a$, that is disposed above the bracket 30. Thereupon the reel and plate are secured in position on the bracket, as hereinbefore described. This will return the parts to the position shown in Fig. 5, and the winding up of the reel will draw the line taut, and it will be retained in place by the pawl 25 now being in engagement with its ratchet-wheel 24.

It will be observed that the handles or bars 34 35 are thrown back against the attaching-plate, as indicated in Fig. 7, where they will be out of the way and not interfere with the attachment of the plate 12 to the bracket.

Having thus described my invention, I claim as new and desire to secure by Letters Patent—

1. In a device of the character described, the combination of a supporting member, an attaching member arranged to be removably attached to the supporting member, a reel revolubly carried by the attaching member, and one or more handles secured to the attaching member and arranged to fold back against the member and thereby lie between said members when in engagement.

2. In a device of the character described, the combination of a supporting member, an attaching member removably applied to the supporting member and provided with an opening, a revoluble reel carried by the attaching member, an angular brake device for the reel working through said opening, and one or more handles carried by the attaching member and adapted to be folded thereagainst to lie between the two said members.

3. In a device of the character described, the combination of a bracket-plate having portions doubly bent over toward each other forming opposite channels in each end of the plate, and an attaching-plate having its extremities bent out at right angles, and then again bent in opposite directions parallel with the plate, the upper bent portion of the bracket-plate having a portion removed intermediate of its ends, the extension of the attaching-plate being of less length than the plate and arranged to enter the said upper bent portion of the bracket having a cut-away portion, the attaching-plate being of less extreme length than the distance between the bottom of the channels in the said bracket-plate.

4. In a device of the character described, the combination of a bracket-plate, an attaching-plate arranged to be removably secured to the bracket-plate, a reel revolubly mounted on the attaching-plate, a guide-arm secured to the attaching-plate and having an eye portion overhanging the reel, a ratchet-wheel secured to the reel, a pawl pivoted on the attaching-plate and arranged to engage the ratchet-wheel, and a pair of pivoted handles secured to the attaching-plate and arranged to be folded back against the plate to thereby permit it to be assembled on the bracket-plate.

In testimony whereof I have signed my name to this specification in the presence of two subscribing witnesses.

CHARLES W. OTT.

Witnesses:
WILL J. WATSON,
L. A. WILSON.